(12) United States Patent
Castro et al.

(10) Patent No.: US 11,916,493 B2
(45) Date of Patent: Feb. 27, 2024

(54) POWER CONVERTER

(71) Applicant: Hamilton Sundstrand Corporation, Charlotte, NC (US)

(72) Inventors: Ignacio Castro, Gijón (ES); Tania Cuesta Cano, Oviedo (ES); Diego Gonzalez Lamar, Gijón (ES); Alberto Rodriguez Alonso, Gijón (ES)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 143 days.

(21) Appl. No.: 17/550,108

(22) Filed: Dec. 14, 2021

(65) Prior Publication Data

US 2022/0209680 A1  Jun. 30, 2022

(30) Foreign Application Priority Data

Dec. 29, 2020  (EP) .................................... 20217690

(51) Int. Cl.
  *H02M 7/217*  (2006.01)
  *H02M 7/483*  (2007.01)
  *H02M 7/49*  (2007.01)

(52) U.S. Cl.
  CPC ........ *H02M 7/2173* (2013.01); *H02M 7/2176* (2013.01); *H02M 7/483* (2013.01); *H02M 7/49* (2013.01)

(58) Field of Classification Search
  CPC .. H02M 7/2173; H02M 7/2176; H02M 7/483; H02M 7/49
  See application file for complete search history.

(56) References Cited

U.S. PATENT DOCUMENTS

| | | | |
|---|---|---|---|
| 8,994,206 B2 | 3/2015 | Bala et al. | |
| 9,356,536 B2 | 5/2016 | Bala et al. | |
| 9,525,284 B2* | 12/2016 | Kim | H02J 3/381 |
| 9,692,311 B2 | 6/2017 | Kim et al. | |
| 9,859,806 B2 | 1/2018 | Das et al. | |
| 2015/0155716 A1* | 6/2015 | Balda | H02M 7/4835 363/35 |
| 2016/0329832 A1 | 11/2016 | Aeloiza et al. | |
| 2019/0296654 A1* | 9/2019 | Azidehak | H02M 5/4585 |
| 2019/0338753 A1 | 11/2019 | Biris et al. | |

FOREIGN PATENT DOCUMENTS

CN  100557935 C  11/2009
WO  2011008466 A2  1/2011

OTHER PUBLICATIONS

European Search Report for Application No. 20217690.5, dated Jun. 21, 2021, 36 pages.
Guan, et al. "A Medium-Voltage Wind Generation Systems Based on MPMSG and MMC and Its Fault-Tolerant Control Strategy". 2019 IEEE 3rd International Electrical and Energy Conference (CIEEC), Sep. 7, 2019, pp. 689-694.

(Continued)

*Primary Examiner* — Gary A Nash
(74) *Attorney, Agent, or Firm* — CANTOR COLBURN LLP (57) ABSTRACT

A modular electric power converter includes a plurality of power converter modules, each module comprising a cell of a Modular Multilevel Converter, MMC, to provide a controlled ac output.

10 Claims, 8 Drawing Sheets

(56) References Cited

OTHER PUBLICATIONS

Parker, et al. "Fault-Tolerant Control for a Modular Generator-Converter Scheme for Direct-Drive Wind Turbines" IEEE Transactions on Industrial Electronics, vol. 58, No. 1, Jan. 2011. pp. 305-315.
Yuan, "A Set of Multilevel Modular Medium-Voltage High Power Converters for 10-MW Wind Turbines" IEEE Transactions on Sustainable Energy, vol. 5, No. 2, Apr. 2014. 11 pages.
B.W. Sixing Du, et al. "Fundamentals of Modular Multilevel Converter" Chapter 2, Modular Multilevel Converters: Analysis, Control, and Applications, First Edition., 2018 The Institute of Electrical and Electronics Engineers, Inc. Published by John Wiley & Sons, Inc., pp. 37-47.
H.-P. N.S.N. Kamran Sharifabadi, et al., "Design, Control and application of modular multilevel controllers for HVDC transmission systems", Introduction to Modular Multilevel Converters, Ed. IEEE Press, 2016., pp. 23-26 and 104-112.

\* cited by examiner

POWER CONVERTER

CROSS REFERENCE TO RELATED APPLICATIONS

This application claims priority to European Patent Application No. 20217690.5 filed Dec. 29, 2020, the entire contents of which is incorporated herein by reference.

TECHNICAL FIELD

The present disclosure relates to a topology for a power converter for multi-phase generators with both AC and DC loads.

BACKGROUND

There are many fields where electrical power from a power source needs to be controlled and distributed to various loads with different power requirements.

Many loads connected to AC supplies require DC power or to control AC power and frequency, therefore power conversion is required.

This is common, for example, in aircraft in which the aircraft is equipped with an internal 3-phase network. The frequency of the electric current over the power supply network can be varied.

Electric power systems onboard aircraft are generally powered by generators that use rotation of the aircraft engine to generate AC power, usually 230V, 360-800 Hz AC power. Often, onboard equipment requires DC power or AC power at different frequencies and so a power converter unit is usually provided to provide a suitable rectified DC output or controlled AC to them. Power converters are also used in many other fields e.g. applications associated with the electrical grid, railway applications, vehicles, wind generators and many more.

In conventional power generators, a multiphase generator generates a multiphase ac current. The ac voltage has to be converted as appropriate to be provided to the load to be operated, at the required voltage and frequency.

Aircraft (and other vehicles) often have a large number of ac and dc electric loads that require proper power management. The number of electric loads is increasing with the more toward so-called 'more electric' or 'all electric' aircraft (MEA or AEA). It is important that the electrical power distribution system is reliable and efficient and that the specific power density requirements are met. Due to the increased number of loads, the size and weight of the on-board electrical system and the cabling is increasing. Increased weight and bulk is particularly undesirable in aircraft as increased weight leads to reduced fuel efficiency. Reducing the weight of cables requires increasing the dc or ac voltage used for the power distribution.

For high power applications, e.g. in the MW range, it is preferable to be able to increase the voltage, so that current levels and, thus, cable sizes and weight, can be reduced. High voltage systems therefore weigh less, which is advantageous in many applications, e.g in aircraft.

The power converter topology must be able to operate within these high voltage constraints.

There is, therefore, a need for an improved power converter arrangement that has a smaller and simpler structure with improved realibility and reconfigurability. In particular, there is a need for power converter topologies able to be used for high voltage applications to reduce current levels and, as a result, reduce the weight of the cables.

SUMMARY

The system of the present disclosure provides a power converter having a modular constructions. This has significant advantages in high power, high voltage applications, particularly for MEA and AEA.

According to one aspect, the present disclosure provides an electric power converter comprising a plurality of power converter modules, each module comprising a cell of a Modular Multilevel Converter, MMC, to provide a controlled ac output.

According to another aspect, there is provided a power converter system comprising a multi-phase generator having a plurality of multi-phase windings, and an electric power converter as claimed in any preceding claim, each winding having an associated power converter module connected thereto, each power converter module arranged to provide ac output at a respective selected voltage and frequency.

Examples of the power converter according to the disclosure will now be described by way of example only, with reference to the drawings.

DETAILED DESCRIPTION

Figure 1:
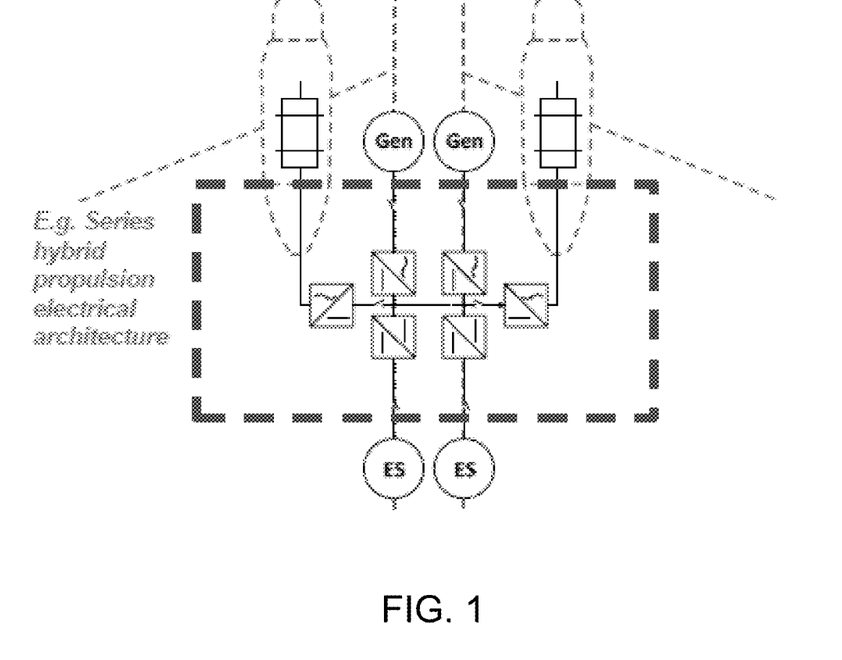
FIG. 1 shows a schematic view of a hybrid propulsion architecture of an aircraft in which the power converter of the disclosure could be used.

Electrical generators in e.g., aircraft prolusion systems, as seen in FIG. 1, typically have an ac generator 100 to which is connected a power converter 200 including a rectifier and an inverter connected to a load. To reduce the impact of fossil fuels, a battery 300 may also be added. The converter provides a two-stage approach to operate ac and dc loads but such a two-stage approach can reduce the efficiency of the system and the power density due to the dc-link requirements.

Another approach (not shown) uses a matrix converter but such converter designs require complex additional stages if a battery is to be included.

The design of the present disclosure integrates a Modular Multilevel Converter (MMC) cell within the ac-dc converter in a multi-phase generator system, performing back-to-back operation while also enabling the integration of a battery within the system.

Figure 2:
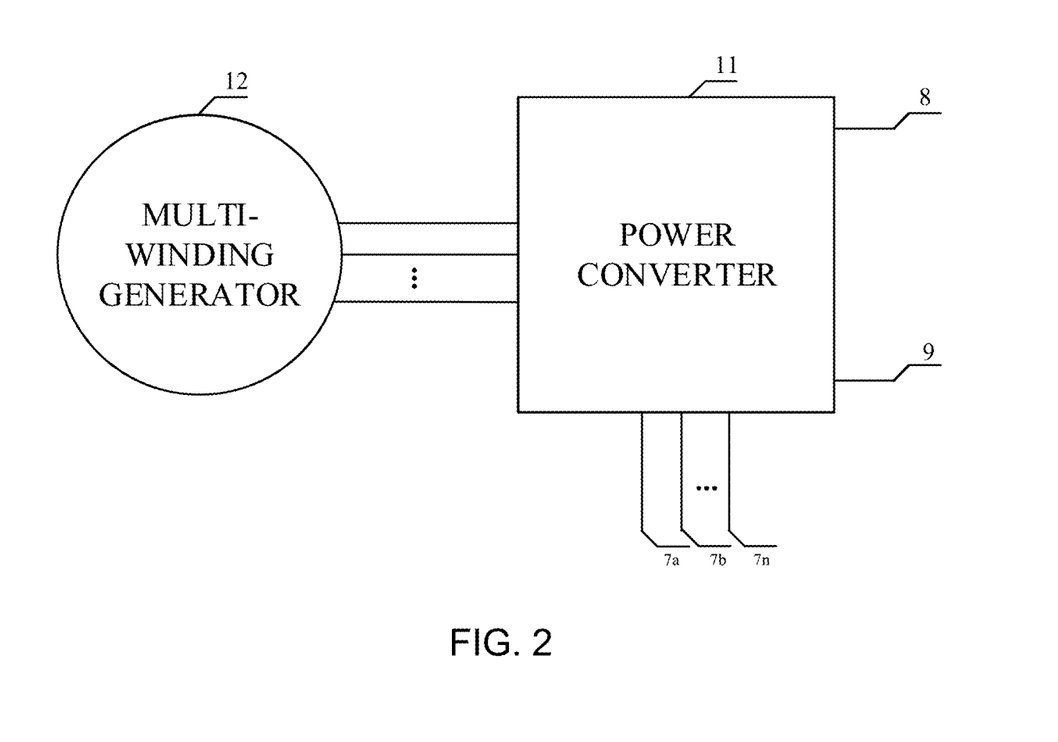
FIG. 2 is a simplified schematic diagram of a multiphase generator incorporating the power converter of the disclosure.

The arrangement of the disclosure uses a multi-winding ac generator 12 having multiple three-phase windings 201-20n. A power converter 11 is connected to the generator 12. The windings in the example are three-phase, but other phases e.g. six, nine, etc. may also be used. The power converter 11 has positive and negative dc output terminals 8, 9 and ac phase outputs 7a, 7b, 7n (where n is the total number of phases).

Figure 3:
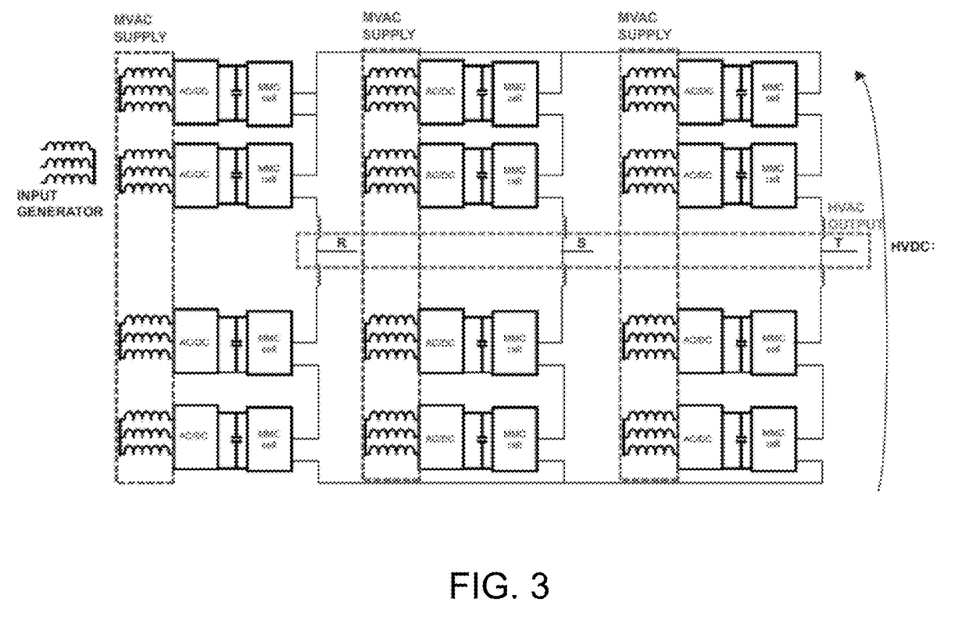
FIG. 3 is a more detailed schematic diagram of a multi-phase generator incorporating the power converter of the disclosure.
Figure 5A:
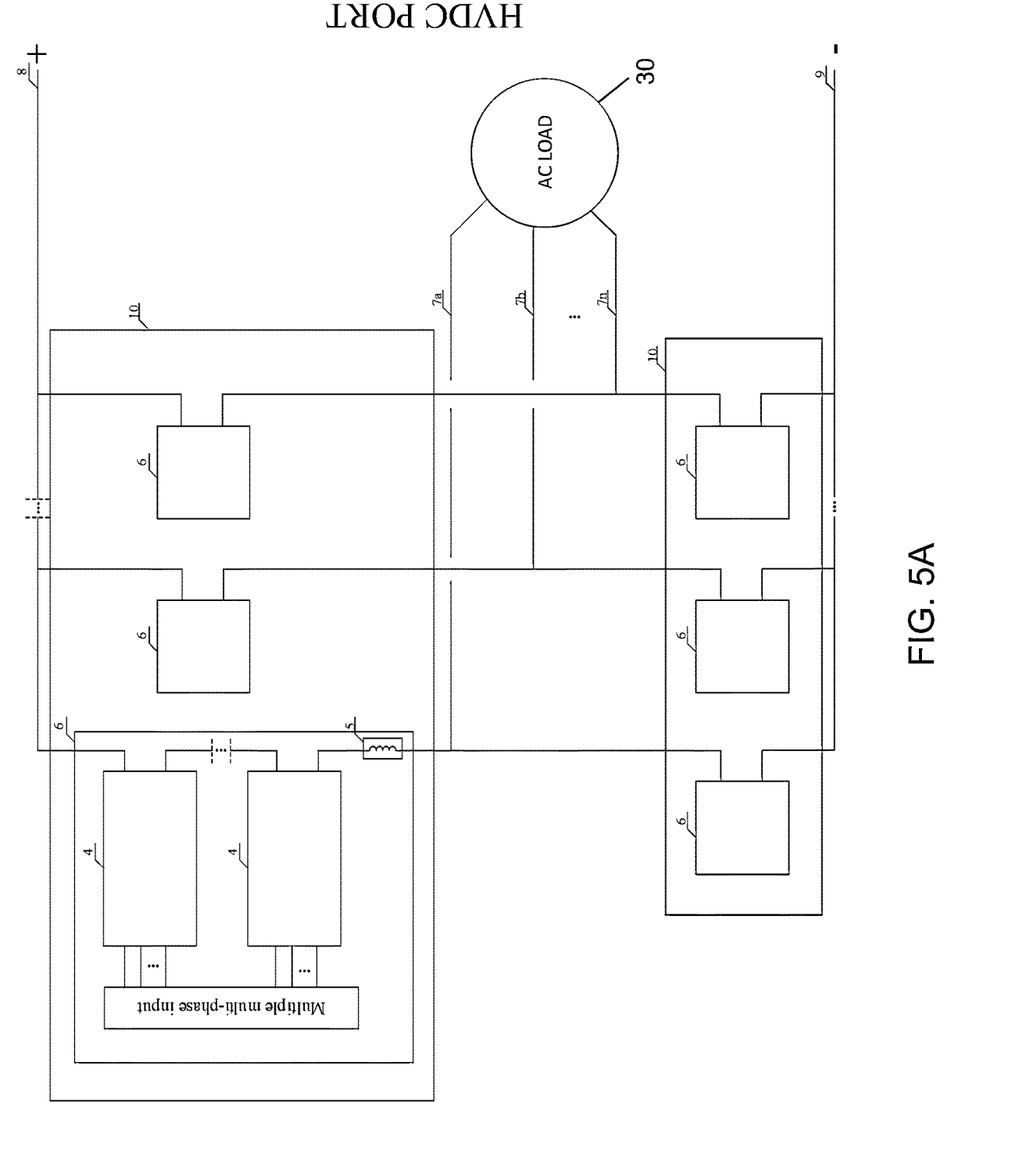
FIG. 5A shows how the converter can be incorporated into a generator.
Figure 5B:
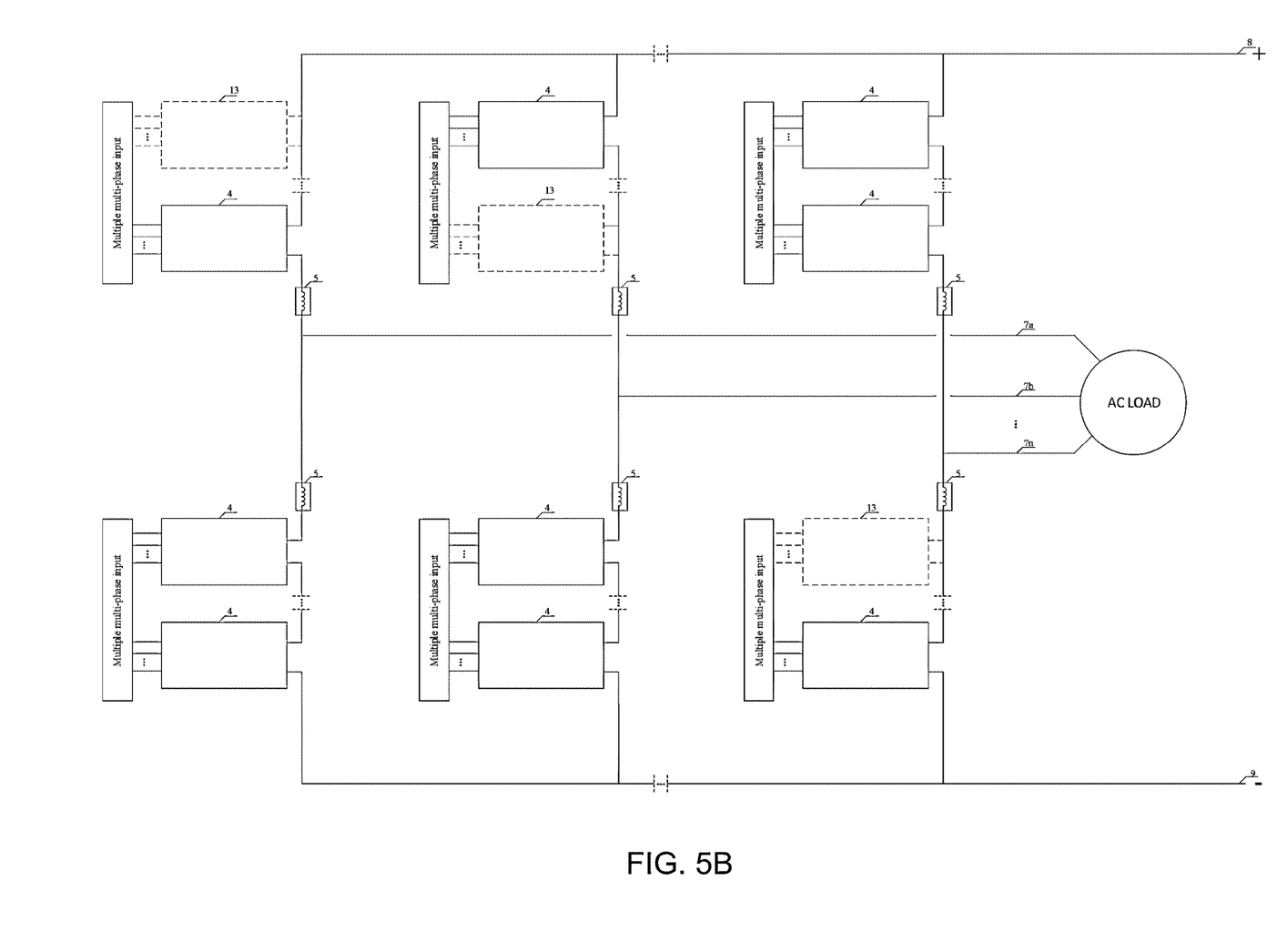
FIG. 5B shows a potential reconfiguration of the arrangement of FIG. 5A.

As seen in FIGS. 5A and 5B and, in more detail in FIG. 3, the power converter 11 comprises for each phase a power chain 6, the power chains for all phases forming a power chain group 10.

Figure 4:
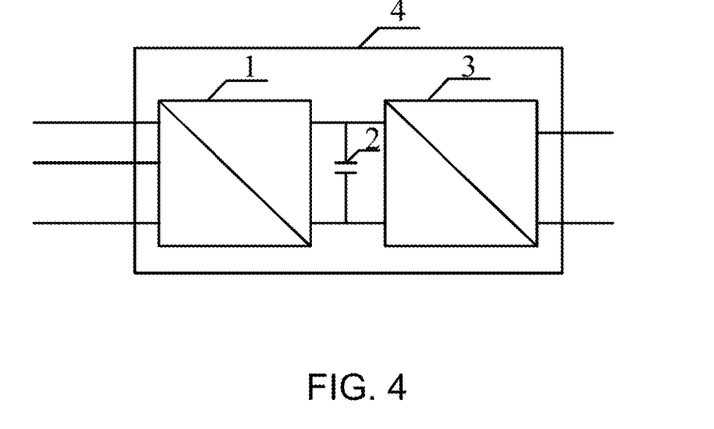
FIG. 4 is a schematic view of a power converter according to the disclosure.

According to this disclosure, the power converter has a modular structure wherein each power chain 6 includes a power converter module 4 for each winding of the generator 12. With reference to FIGS. 3 and 4, the power converter modules each comprise an ac-dc converter 1 and a cell 3 of an MMC connected via a parallel dc-link capacitor 2.

FIGS. 5A and 5B show how the power converter modules 4 are incorporated into the power converter 11. The power converter modules 4 provide dc outputs 8, 9 to operate dc loads and, via an inductor 5, provide ac output 7 for ac loads 30. The outputs can be HVDC and HVAC outputs.

As can best be seen in FIG. 3, a three-phase ac-dc converter 1, with active power factor correction, is connected to a three-phase winding of the generator 12. In some applications, passive ac-dc rectifiers could be included. The ac-dc converter provides a constant dc voltage, scaled according to the power factor correction, at its output. This output is used by the MMC cell 3. The MMC cell can be designed using known MMC technology and design to generate as many levels as required for the loads. MMC cells are described, for example, in B. W. Sixing Du, Apparao Dekka and N. Zargari, Modular Multilevel Converters, wiley, Ed. IEEE Press, 2018 and in H.-P. N. S. N. Kamran Sharifabadi, Lennart Harnefors and S. Norrga., Design, Control and application of modular multilevel controllers for HVDC transmission systems, Ed. IEEE Press, 2016. With the integral rectifier/MMC design of the disclosure, the dc-link capacitor 2 can function not only as the rectifier capacitor but also as the MMC cell capacitor.

Because each module has a capacitor, the dc voltage is distributed between several smaller capacitors rather than requiring one large capacitor. This can reduce the overall weight of the system. An aim is to minimise the dc-link capacitor of each cell, as this can improve power density/reduce overall weight, the importance of which is mentioned above. If a battery is connected to the dc-side of the module, however, the capacitor 2 can be eliminated.

Using the modular structure with MMC cells integrated with the ac-dc rectifiers, different dc outputs can be provided as well as ac/HVAC outputs.

Further, the design of the disclosure can include additional modules at each stage to provide redundancy. Such a design is fault tolerant in that the cell topology can be rearranged to handle both HVAC and HVDC failures as is known for MMC cells.

If one of the power converter modules (13 in FIG. 5B) fails, the system can automatically reconfigure by reversing the diode in the modules indicated by the dashed lines. Due to the redundancy of the modules, the converter will continue to operate.

Figure 6:
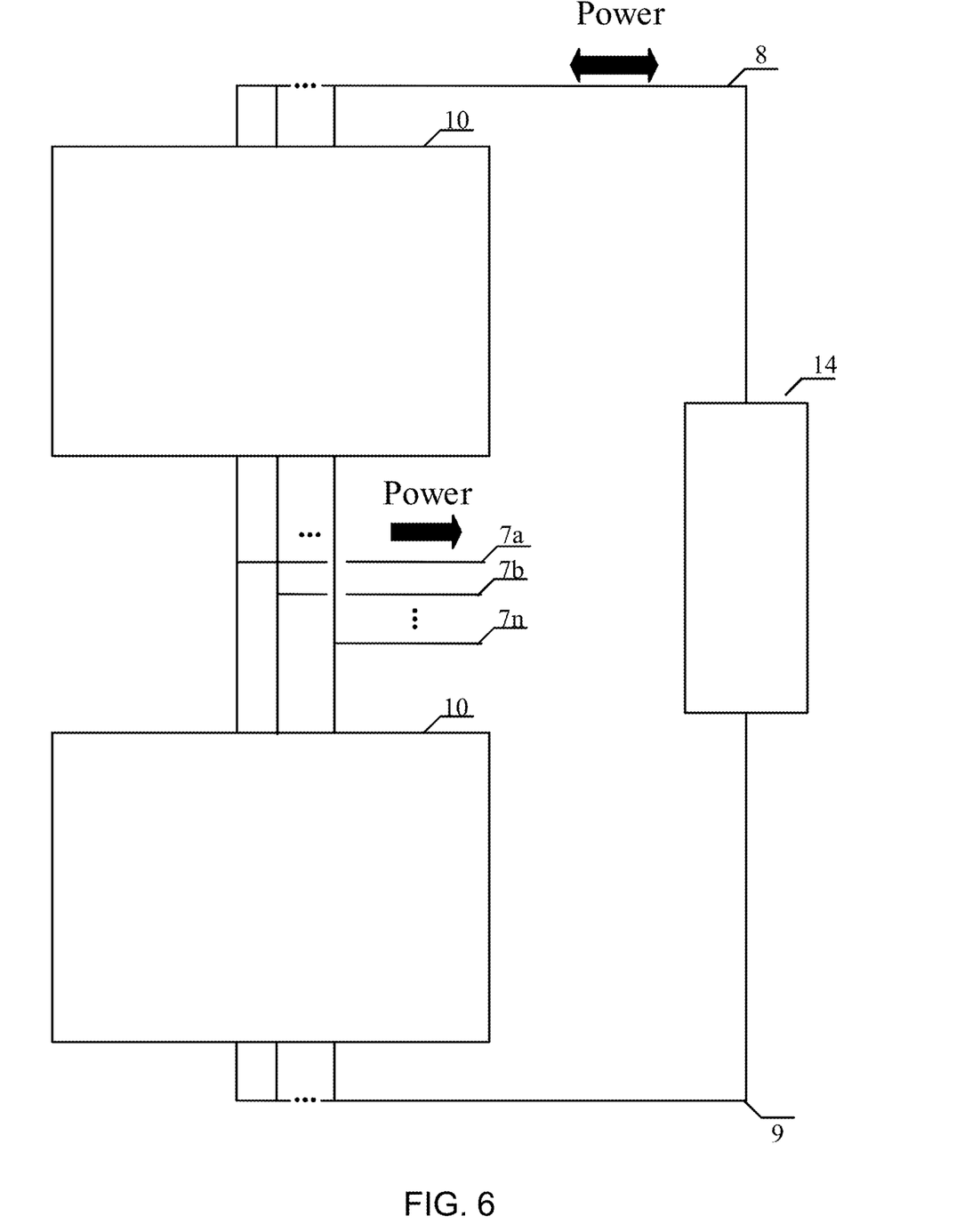
FIG. 6 shows a configuration for one operating mode.
Figure 7:
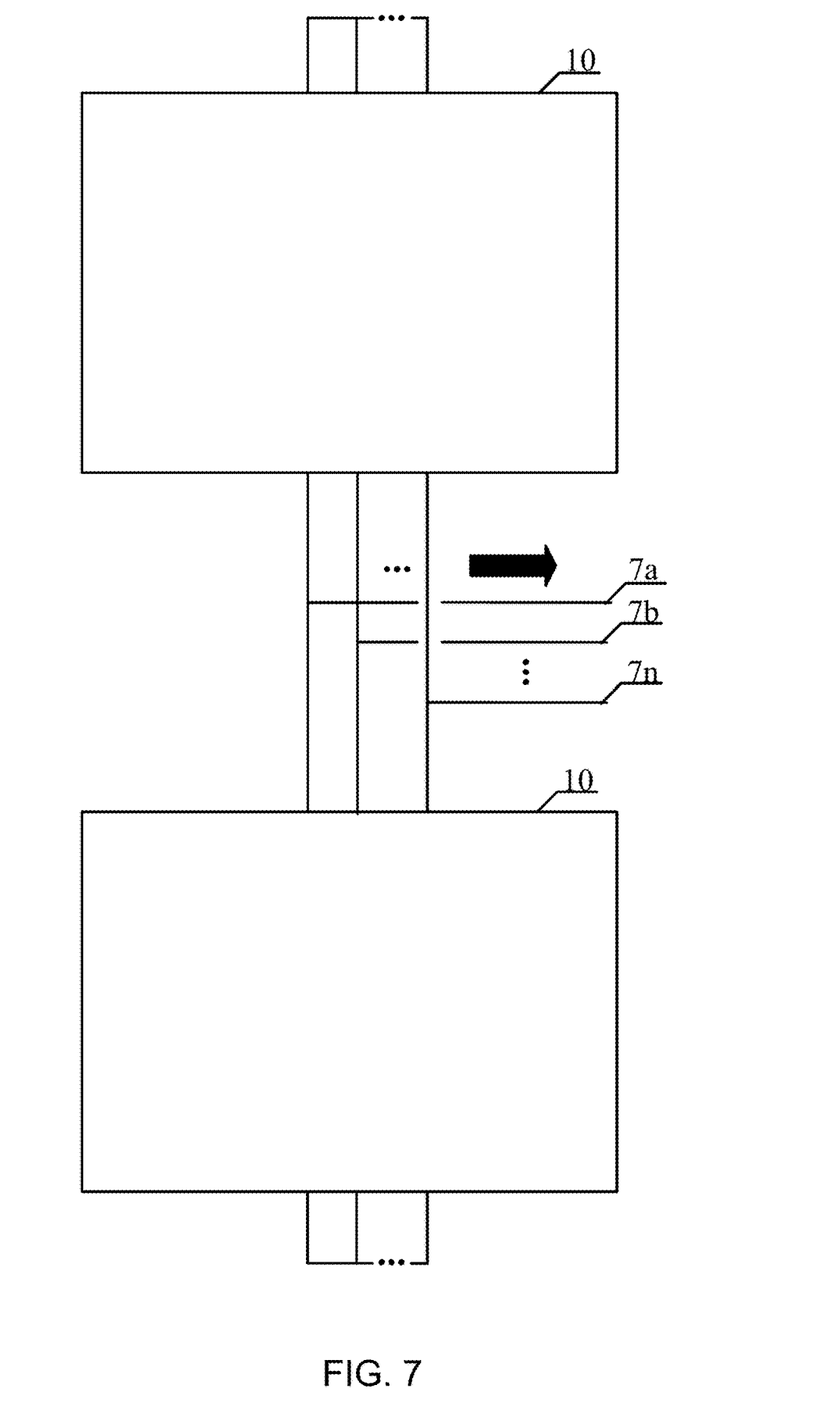
FIG. 7 shows an alternative configuration for a different operating mode.
Figure 8:
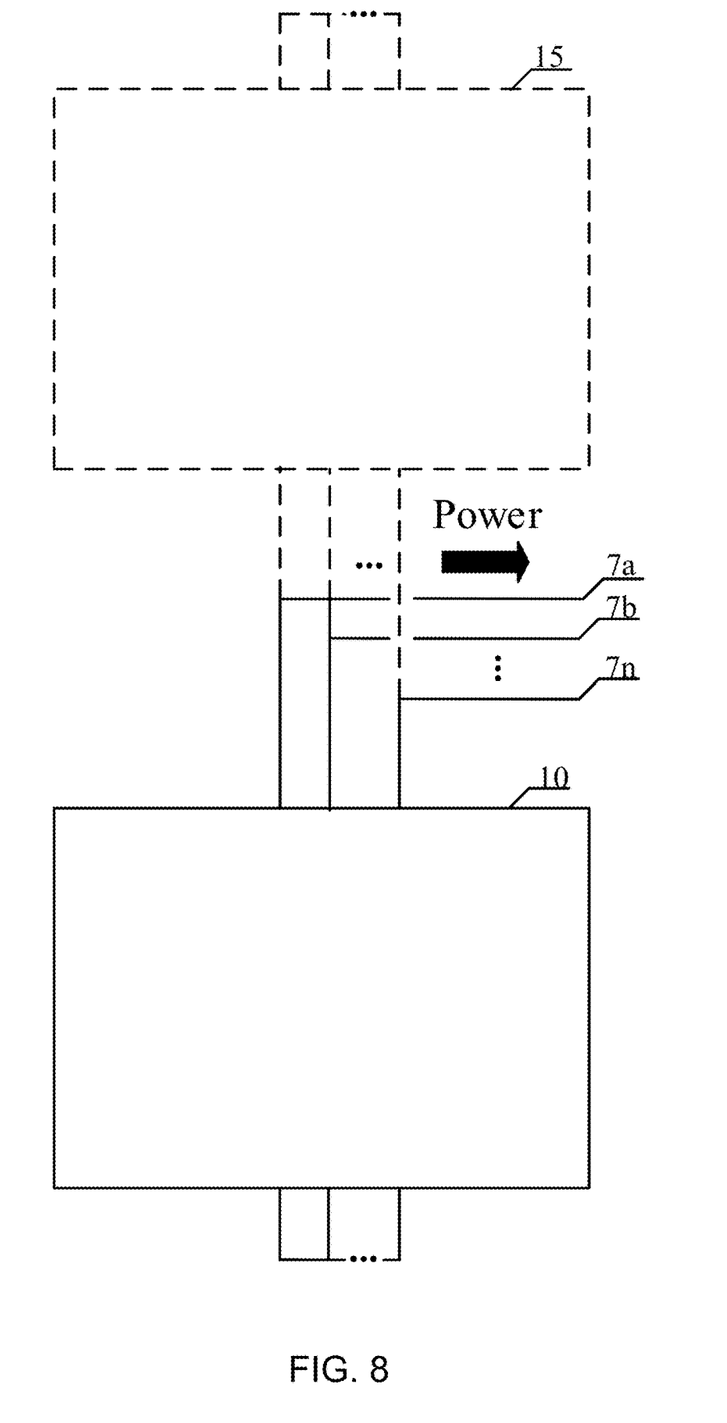
FIG. 8 shows an alternative configuration for a different operating mode.
Figure 9:
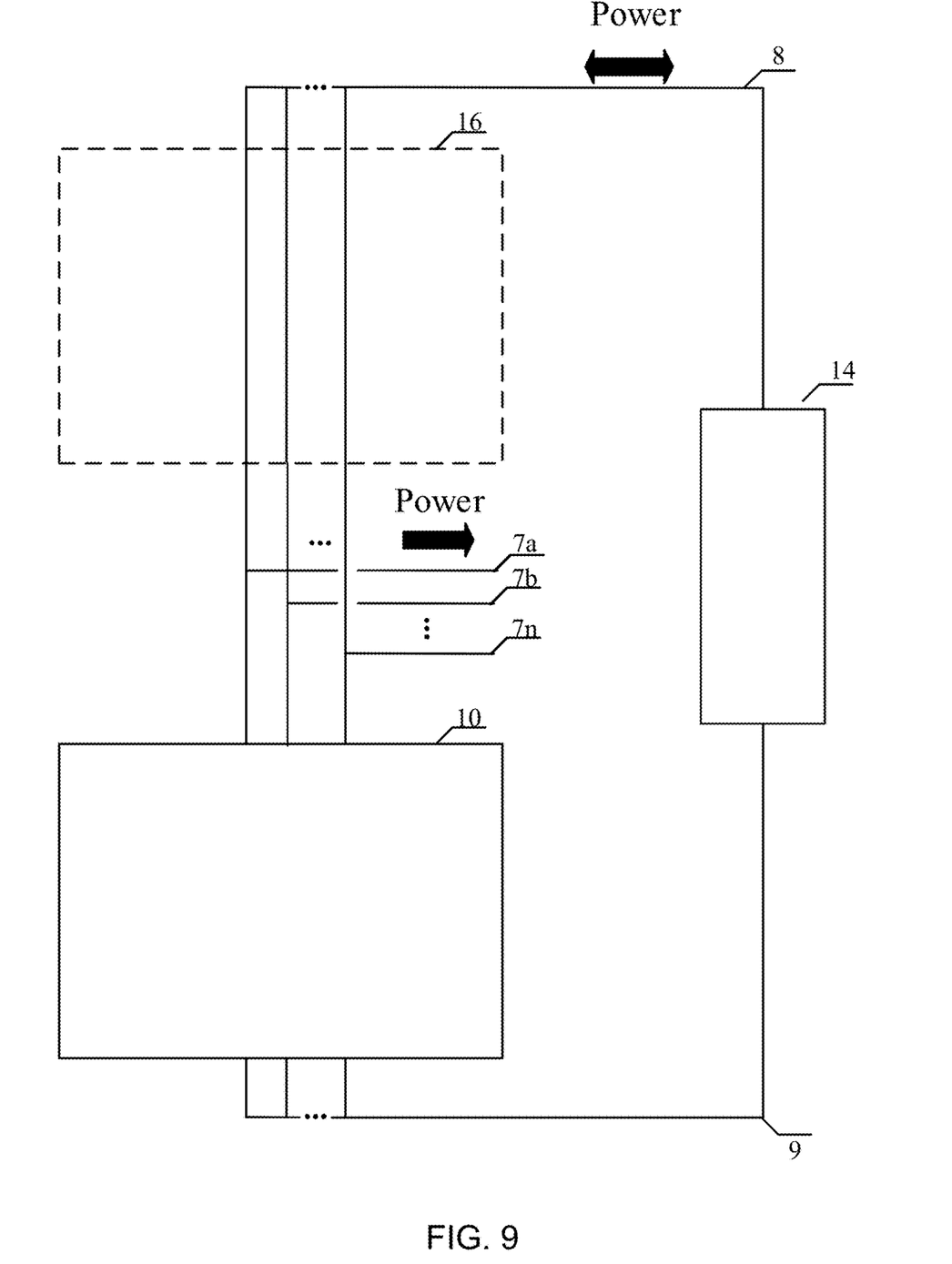
FIG. 9 shows an alternative configuration for a different operating mode.

The design of this disclosure also simplifies the addition of a battery 14 to the dc-link. A battery 14 is connected between the dc outputs 8, 9 as shown in FIG. 6 without the need for further conversion stages. If the battery 14 fails (FIG. 7), the system can continue to operate. Similarly, as shown in FIG. 8, if the battery 14 and one of the power chains (here, upper power chain 15) fails, the built-in redundancy will allow the system to continue to operate. FIG. 9 shows the redundancy effect in the event of a power chain failing but the battery remaining functional.

It is also conceivable for the system to be designed without the additional components that provide redundancy/fault tolerance, although reliability is then reduced.

The use of a multi-winding generator 12 allows the output power to be split into independent systems, each having a modular power converter stage which can be weighted and controlled differently to provide different outputs. Such a modular design is simpler than know serial/parallel configurations. The modular design of the disclosure is also advantageous in that it can provide both ac and dc outputs.

The modular structure of the disclosure also allows for redundancy and/or reconfigurability.

Another advantage of the MMC/modular design is that fewer windings could be used and, instead, the MMC cells could be multilevel cells. The design could also have a hybrid MMC in that some of the module cells are supplied by the generator while others are supplied by another power source.

In the event of failures in different parts of the system, the system can be reconfigured to mitigate failure.

The invention claimed is:

1. A power converter system comprising:
    an electric power converter comprising:
        a plurality of power converter modules,
        wherein each module includes:
            an ac-dc rectifier providing a dc output; and
            a cell of a Modular Multilevel Converter (MMC) connected to the dc output to provide a controlled ac output and a controlled dc output; and
    a multi-phase generator having a plurality of multi-phase windings;
    wherein each winding has an associated power converter module connected thereto, each power converter module arranged to provide the controlled ac output at a respective selected voltage and frequency.

2. The power converter system claim 1, wherein the electric power converter further includes a dc-link capacitor connected across the output of the ac-dc rectifier.

3. The power converter system claim 1, wherein the plurality of power converter modules together further provide a dc bus.

4. The power converter system of claim 1, wherein the windings are three-phase windings.

5. The power converter system of claim 1, further comprising:
    a power chain for each phase, each power chain comprising a power converter module for each winding.

6. The power converter system of claim 5, wherein the system is configured to reconfigure in response to failure of a power chain.

7. The power converter system of claim 1, wherein the electric power converter provides a dc output, and the system further comprising:
    a battery connected across the dc output.

8. The power converter system of claim 7, wherein the system is configured to reconfigure in response to failure of the battery.

9. The power converter system of claim 1, wherein each winding has two associated power converter modules connected thereto.

10. The power converter system of claim 9, wherein the system is configured to reconfigure in response to failure of a power converter module.

* * * * *